United States Patent
Bakran et al.

(10) Patent No.: US 11,411,511 B2
(45) Date of Patent: Aug. 9, 2022

(54) SWITCHABLE LONGITUDINAL VOLTAGE SOURCE, DIRECT CURRENT TRANSMISSION SYSTEM WITH LONGITUDINAL VOLTAGE SOURCE AND METHOD FOR OPERATING A LONGITUDINAL VOLTAGE SOURCE

(71) Applicant: SIEMENS ENERGY GLOBAL GMBH & CO. KG, Munich (DE)

(72) Inventors: Mark-Matthias Bakran, Erlangen (DE); Viktor Hofmann, Bayreuth (DE); Andre Schoen, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/279,724

(22) PCT Filed: Sep. 25, 2018

(86) PCT No.: PCT/EP2018/076001
§ 371 (c)(1),
(2) Date: Mar. 25, 2021

(87) PCT Pub. No.: WO2020/064091
PCT Pub. Date: Apr. 2, 2020

(65) Prior Publication Data
US 2021/0399633 A1 Dec. 23, 2021

(51) Int. Cl.
*H02M 7/483* (2007.01)
*H02J 3/36* (2006.01)
*H02M 3/155* (2006.01)

(52) U.S. Cl.
CPC ......... *H02M 7/4835* (2021.05); *H02M 3/155* (2013.01); *H02J 3/36* (2013.01); *H02M 7/4837* (2021.05)

(58) Field of Classification Search
CPC ...... H02J 3/36; H02J 1/14; H02J 1/06; H02M 3/07–078; H02M 7/483–4835
See application file for complete search history.

(56) References Cited

U.S. PATENT DOCUMENTS 9,774,187 B2   9/2017   Eckel
9,912,247 B2   3/2018   Chung et al.
(Continued)

FOREIGN PATENT DOCUMENTS

CN   104184139 A   12/2014
CN   107112760 A   8/2017
(Continued)

OTHER PUBLICATIONS

Barker, C.D. et al., "A Current Flow Controller for Use in HVDC Grids", Alstom Grid UK, Power Electronic Activities, ST Leonards Ave. Stafford ST174LX.
(Continued)

*Primary Examiner* — Peter M Novak
(74) *Attorney, Agent, or Firm* — Laurence A. Greenberg; Werner H. Stemer; Ralph E. Locher

(57) ABSTRACT

A switchable longitudinal voltage source has a first feed connection for feeding in a first current, a first output connection for outputting the first current, a second feed connection for feeding in a second current, and a second output connection for outputting the second current. An electrical energy store has a first connection and a second connection coupled to the output connections. The switchable longitudinal voltage source further has a center terminal of a first series circuit which directly forms the first output connection or terminal and a center terminal of a second series circuit which directly forms the second output connection or terminal.

18 Claims, 8 Drawing Sheets

(56) References Cited

U.S. PATENT DOCUMENTS

| | | | |
|---|---|---|---|
| 10,714,939 B2 | 7/2020 | Bakran et al. | |
| 2005/0068010 A1 | 3/2005 | Chen et al. | |
| 2015/0207310 A1* | 7/2015 | Bakran | H01H 9/542 |
| | | | 361/100 |
| 2015/0256081 A1* | 9/2015 | Bakran | H02M 3/33584 |
| | | | 363/21.01 |
| 2017/0324247 A1 | 11/2017 | Hassan et al. | |
| 2019/0334453 A1* | 10/2019 | Buchmann | H02M 7/483 |
| 2020/0274370 A1 | 8/2020 | Krieg | |
| 2020/0313571 A1 | 10/2020 | Andersson et al. | |

FOREIGN PATENT DOCUMENTS

| | | |
|---|---|---|
| CN | 111433994 A | 7/2020 |
| EP | 1035637 A2 | 9/2000 |
| EP | 2845288 A1 | 3/2015 |
| TW | I228859 B | 3/2005 |
| WO | 2013004019 A1 | 1/2013 |
| WO | WO 2017102414 A1 | 6/2017 |
| WO | WO 2017108073 A1 | 6/2017 |

OTHER PUBLICATIONS

Hassan, Fainan et al., "Double modulation control (DMC) for dual full bridge current flow controller (2FB-CFC)".

Hoffmann, Victor et al., "A modular and scalable HVDC Current Flow Controller"; University of Bayreuth, Department of Mechatronics Center of Energy Technology; EPE'15 ECCE Europe; European Power Electronics and Drives Association & the Institute of Electrical and Electronics Engineers (IEEE); ISBN: 9789075815238 and CFP15850-USB.

Hoffmann, Victor et al., "A DC Current Flow Controller for Meshed HVDC Grids", Department of Mechatronics, University of Bayreuth, Center of Energy, Technology, Bayreuth, Germany.

Zhou Guoliang: "Research on the Control Strategies of Voltage Source Converter Based HVDC", China Doctoral Dissertation Submitted to North China Electric Power University, School of Electrical and Electronic Engineering, Apr. 2009.

\* cited by examiner

SWITCHABLE LONGITUDINAL VOLTAGE SOURCE, DIRECT CURRENT TRANSMISSION SYSTEM WITH LONGITUDINAL VOLTAGE SOURCE AND METHOD FOR OPERATING A LONGITUDINAL VOLTAGE SOURCE

Switchable longitudinal voltage source, direct current transmission system with longitudinal voltage source and method for operating a longitudinal voltage source

BACKGROUND OF THE INVENTION

Field of the Invention

The invention relates inter alia to a switchable longitudinal voltage source having the features according to the preamble of patent claim 1. A longitudinal voltage source of this type is known from document WO 2017/108073 A1. The previously known longitudinal voltage source has two H-bridge modules each with four semiconductor switches.

SUMMARY OF THE INVENTION

The invention is based on the object of specifying a switchable longitudinal voltage source that manages with particularly few components.

Said object is achieved according to the invention by way of a longitudinal voltage source having the features according to the first independent patent claim. Advantageous configurations of the longitudinal voltage source according to the invention are specified in the dependent claims.

It is accordingly provided in accordance with the invention that the center connection of the first series circuit directly forms the first output connection and the center connection of the second series circuit directly forms the second output connection.

A significant advantage of the longitudinal voltage source according to the invention can be regarded as that of it managing or being able to manage with relatively few switches and in this case still making it possible to distribute current or distribute load flow over, for example, two downstream high-voltage direct current transmission lines of a DC voltage transmission system.

It is advantageous when the second switching device, the first switching unit and the first switch are each formed by an externally controllable valve or each have one or more externally controllable valves.

The externally controllable valves are preferably valves that can be switched on and off, preferably mechanical switches or transistors having a diode connected in antiparallel therewith.

The first and second switch, the first and second switching unit and the first and second switching device each preferably exhibit unipolar switching.

With regard to the use of as many component parts of identical structure as possible, it is advantageous when the first and second switch are of identical structure and/or the first and second switching unit are of identical structure and/or the first and second switching device are of identical structure and/or switches of the first switching device are of identical structure to the switch or switches of the second switching unit and/or switches of the first switching device are of identical structure to the second switch and/or switches of the second switching unit are of identical structure to the second switch.

In a particularly preferred configuration, it is provided that the first and second switching unit are each formed by one switch or two or more series-connected switches, the first and second switching device are each formed by two or more series-connected switches and the first and second switching device each have one more switch than the first and second switching unit. All the aforementioned switches preferably each exhibit unipolar switching.

In another advantageous configuration, it is provided that at least one of the switches of the longitudinal voltage source is formed by a non-controllable valve, in particular solely by a diode. It is particularly advantageous when at least one of the switches, preferably all switches, of the first switching device is formed by a non-controllable valve, in particular a diode, at least one of the switches, preferably all switches, of the second switching unit is formed by a non-controllable valve, in particular a diode, and/or the second switch is formed by a non-controllable valve, in particular a diode.

The invention further relates to an arrangement having a longitudinal voltage source. A polarity reversal device is arranged downstream of the longitudinal voltage source and is connected between the two output connections and two conductor connection contacts of the longitudinal voltage source, wherein the polarity reversal device in a first position connects the first output connection to the first conductor connection contact and the second output connection to the second conductor connection contact and wherein the polarity reversal device in a second position connects the first output connection to the second conductor connection contact and the second output connection to the first conductor connection contact.

The invention furthermore relates to a longitudinal voltage source cascade. With respect to such a longitudinal voltage source cascade, it is provided according to the invention that it has two or more longitudinal voltage sources, as described above. With respect to the advantages of the longitudinal voltage source cascade according to the invention, reference is made to the above statements in connection with the longitudinal voltage source according to the invention.

It is advantageous when a first input of the longitudinal voltage source cascade is formed by a first feed connection of the first longitudinal voltage source of the longitudinal voltage source cascade, a second input of the longitudinal voltage source cascade is formed by a second feed connection of the first longitudinal voltage source of the longitudinal voltage source cascade, a first output of the longitudinal voltage source cascade is formed by a first output connection of the last longitudinal voltage source of the longitudinal voltage source cascade, a second output of the longitudinal voltage source cascade is formed by a second output connection of the last longitudinal voltage source of the longitudinal voltage source cascade, in each case one longitudinal voltage source is arranged downstream of each longitudinal voltage source with the exception of the last, wherein the first feed connection of each downstream longitudinal voltage source is connected to the first output connection of the upstream longitudinal voltage source and the second feed connection of each downstream longitudinal voltage source is connected to the second output connection of the upstream longitudinal voltage source.

It is also advantageous when the dielectric strength of the switching devices and switching units of the longitudinal voltage sources of the longitudinal voltage source cascade increases from longitudinal voltage source to longitudinal voltage source in each case by the cutoff voltage of the energy store of the longitudinal voltage sources.

The number of switches per switching unit and switching device preferably increases from longitudinal voltage source to longitudinal voltage source in each case by one switch.

The invention furthermore relates to a direct current transmission system. With respect to such a direct current transmission system, it is provided according to the invention that it has at least one longitudinal voltage source, as described above, and/or one longitudinal voltage source cascade, as described above, and has a first and a second high-voltage direct current transmission line, which is connected to the output connections of the longitudinal voltage source or the outputs of the longitudinal voltage source cascade.

With respect to the advantages of the direct current transmission system according to the invention, reference is made to the above statements in connection with the longitudinal voltage source according to the invention.

It is advantageous when a polarity reversal device is arranged downstream of the longitudinal voltage source and is connected between the two output connections and two conductor connection contacts of the longitudinal voltage source, wherein the polarity reversal device in a first position connects the first output connection to the first conductor connection contact and the second output connection to the second conductor connection contact and wherein the polarity reversal device in a second position connects the first output connection to the second conductor connection contact and the second output connection to the first conductor connection contact.

The invention furthermore relates to a method for operating a longitudinal voltage source, a longitudinal voltage source cascade or a direct current transmission system, as described above, wherein the energy store is connected either between the first feed connection and the first output connection of the longitudinal voltage source or longitudinal voltage sources or between the second feed connection and the second output connection of the longitudinal voltage source or longitudinal voltage sources or it is disconnected from all of said connections.

With respect to the advantages of the method according to the invention, reference is made to the above statements in connection with the longitudinal voltage source according to the invention.

The invention is explained in more detail below on the basis of exemplary embodiments.

DETAILED DESCRIPTION OF THE INVENTION

For the sake of clarity, the same reference signs are always used for identical or comparable component parts in the figures.

Figure 1:
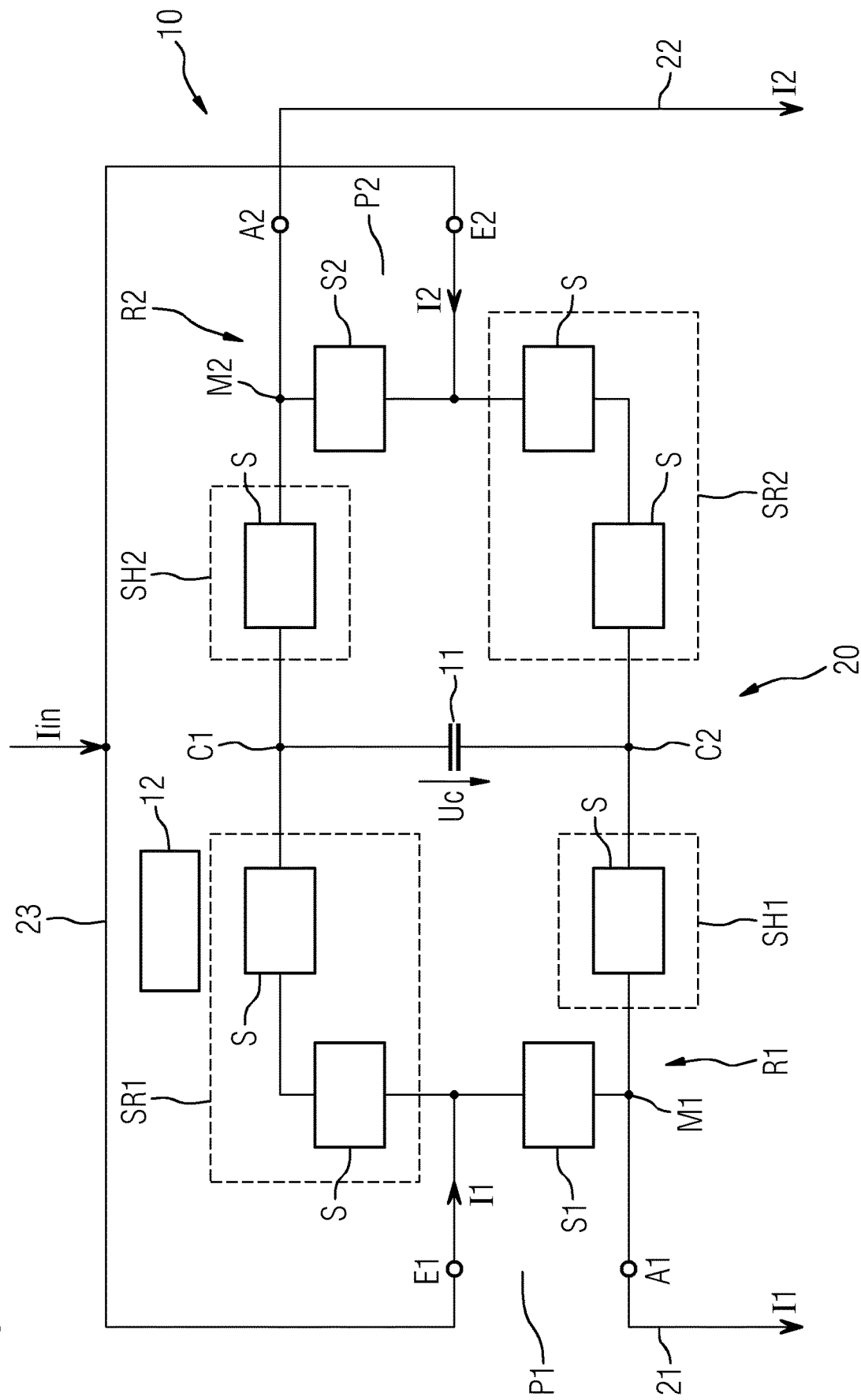
FIG. 1 shows an exemplary embodiment of a direct current transmission system according to the invention, which is provided with an exemplary embodiment of a longitudinal voltage source according to the invention.

FIG. 1 shows an exemplary embodiment of a switchable longitudinal voltage source 10. The longitudinal voltage source 10 comprises a first feed connection E1 for feeding in a first current I1, a first output connection A1 for outputting the first current I1, a second feed connection E2 for feeding in a second current I2 and a second output connection A2 for outputting the second current I2.

The longitudinal voltage source 10 makes it possible to switch a voltage Uc of an electrical energy store 11 of the longitudinal voltage source 10 selectively between the first feed connection E1 and the first output connection A1 or between the second feed connection E2 and the second output connection A2. For this purpose, the first feed connection E1 is able to be connected by means of a first switching device SR1 to a first connection C1 of the energy store 11, the second feed connection E2 is able to be connected by means of a second switching device SR2 to the second connection C2 of the energy store 11.

A first series circuit R1, which comprises a first switch S1 and a first switching unit SH1 and connects the first feed connection E1 to the second connection C2 of the energy store 11, is connected to the first feed connection E1 of the longitudinal voltage source 10.

One of the connections of the first switch S1, subsequently referred to as first connection of the first switch S1, forms an outer connection of the first series circuit R1 as well as the first feed connection E1; one of the connections of the first switching unit SH1, subsequently referred to as first connection of the first switching unit SH1, forms a second outer connection of the first series circuit R1 and is connected to the second connection C2 of the energy store 11. In electrical terms, a center connection M1 of the first series circuit R1, said center connection directly forming the first output connection A1 of the longitudinal voltage source 10, is present between the other connection of the first switch S1, subsequently referred to as second connection of the first switch S1, and the other connection of the first switching unit SH1, subsequently referred to as second connection of the first switching unit SH1.

A second series circuit R2, which comprises a second switch S2 and a second switching unit SH2 and connects the second feed connection E2 to the first connection C1 of the energy store 11, is connected to the second feed connection E2. One of the connections of the second switch S2, subsequently referred to as first connection of the second switch S2, forms a first outer connection of the second series circuit R2 as well as the second feed connection E2 of the longitudinal voltage source 10; one of the connections of the second switching unit SH2, subsequently referred to as first connection of the second switching unit SH2, forms a second outer connection of the second series circuit R2 and is connected to the first connection C1 of the energy store 11. In electrical terms a center connection M2 of the second series circuit R2 is present between the other connection of the second switch S2, subsequently referred to as second connection of the second switch S2, and the other connection of the second switching unit SH2, subsequently referred to as second connection of the second switching unit SH2. The center connection M2 of the second series circuit R2 directly forms the second output connection A2 of the longitudinal voltage source 10.

In the exemplary embodiment according to FIG. 1, the switching devices SR1 and SR2 each consist of two switches S; the two switching units SH1 and SH2 each consist of one switch S.

High-voltage direct current transmission lines 21 and 22 of a direct current transmission system 20 can be connected to the two output connections A1 and A2 of the longitudinal voltage source 10 and a feed line 23 for feeding in an input current Iin can be connected to the two feed connections E1 and E2 of the longitudinal voltage source 10, as is shown by way of example in FIG. 1. The input current Iin flowing in the feed line 23 is divided into the first current I1 and the second current I2, which flow into the longitudinal voltage source 10 at the first feed connection E1 and at the second feed connection E2.

Figure 2:
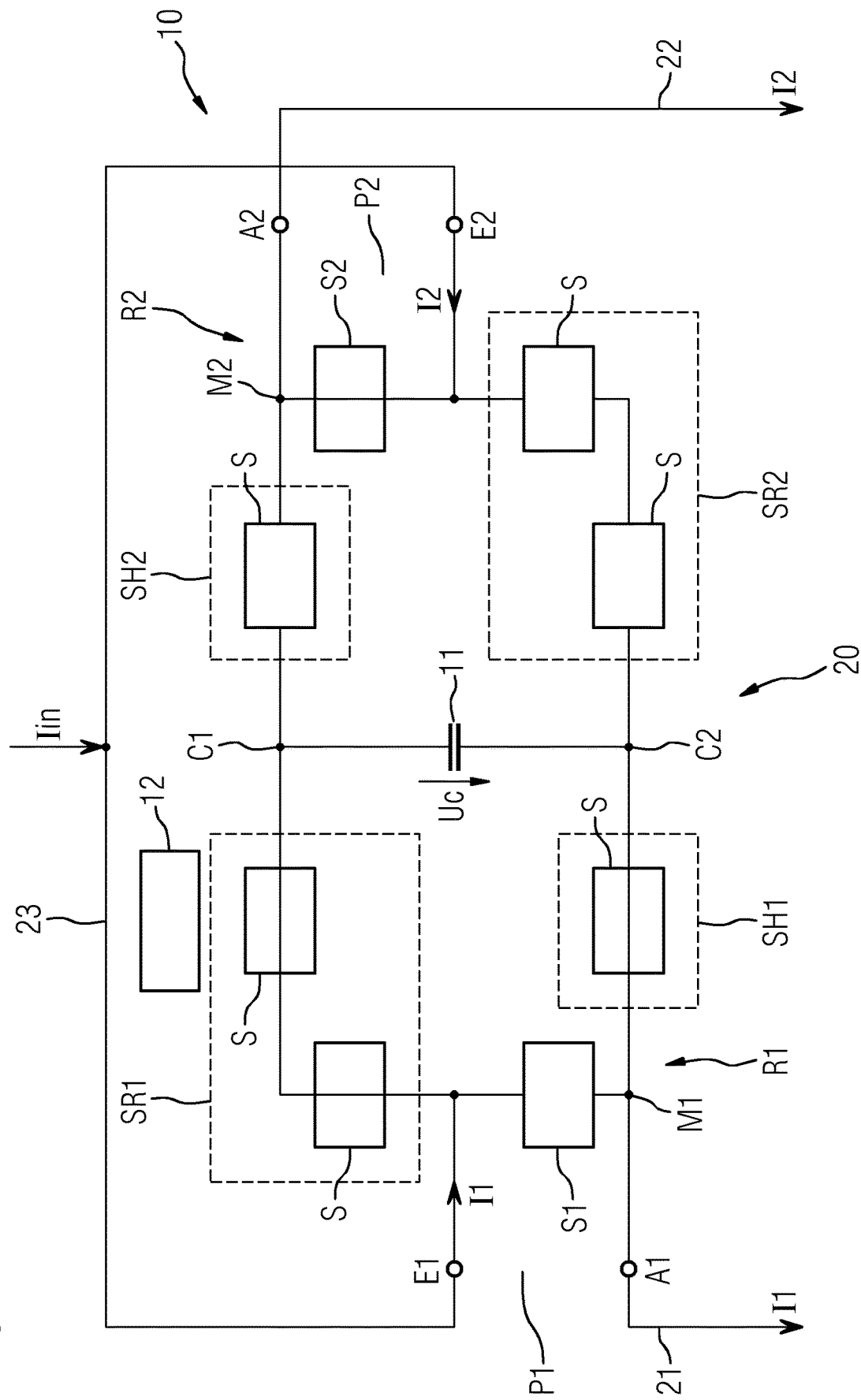
FIG. 2 shows a first operating state of the longitudinal voltage source according to FIG. 1.
Figure 3:
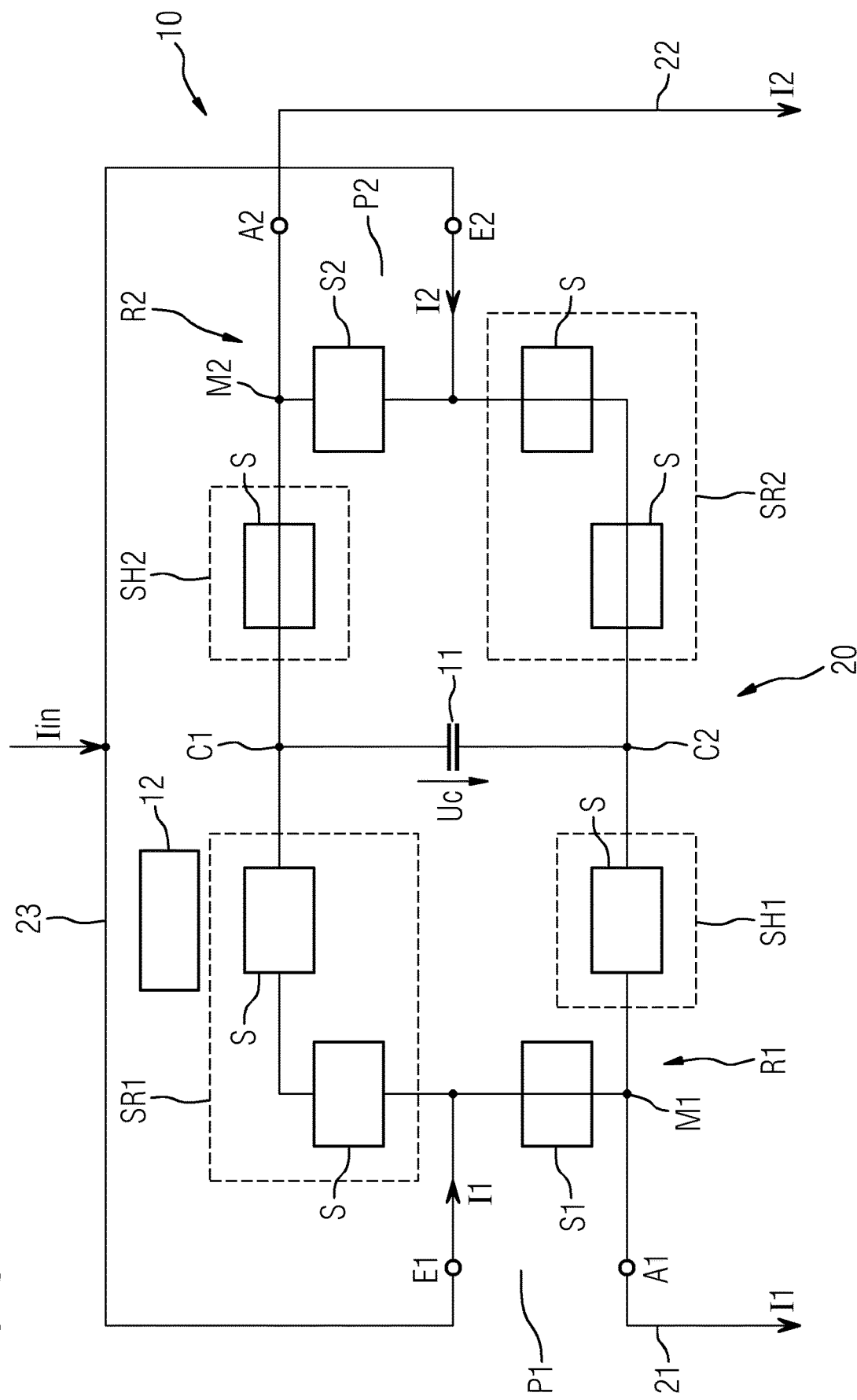
FIG. 3 shows a second operating state of the longitudinal voltage source according to FIG. 1.
Figure 4:
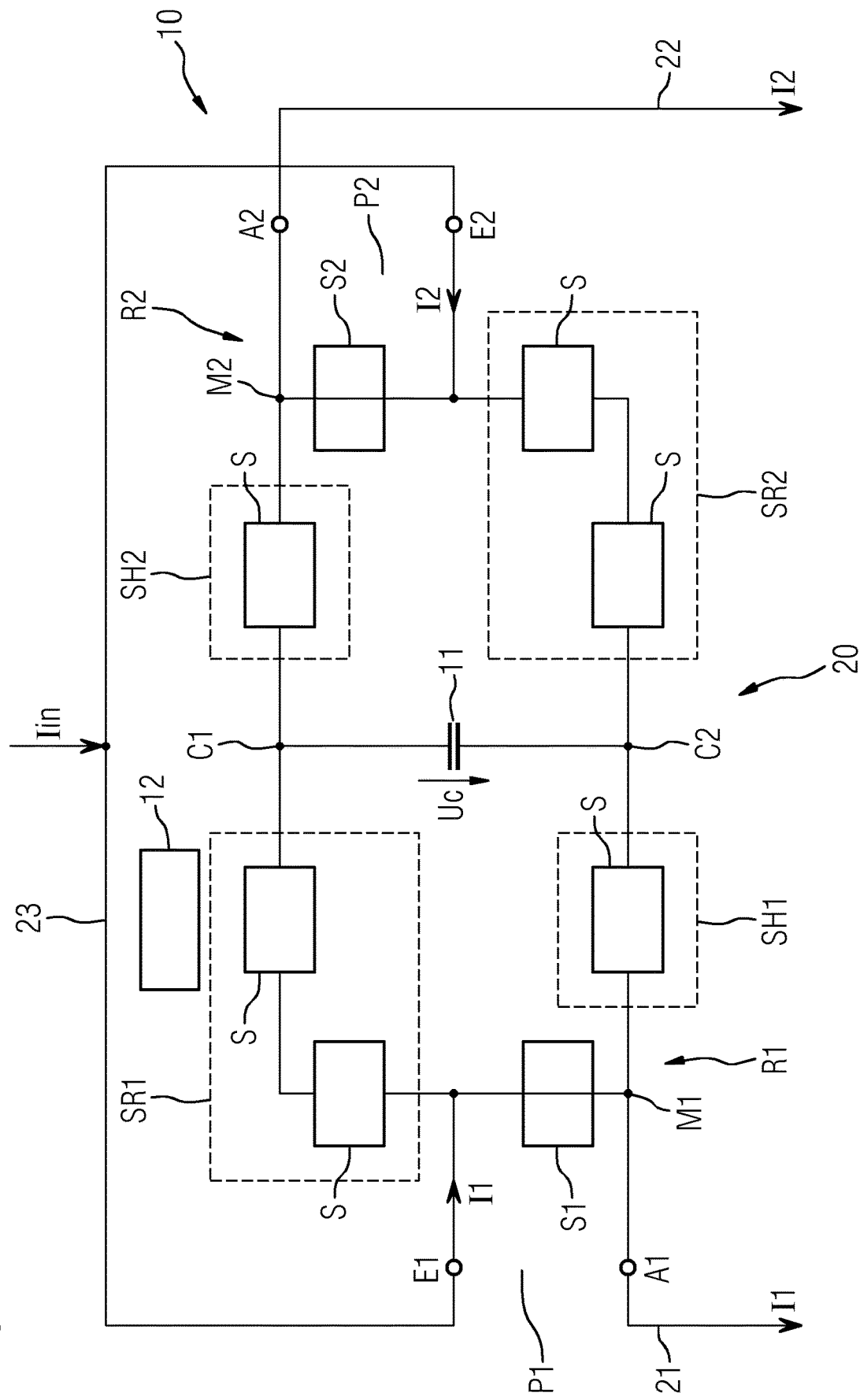
FIG. 4 shows a third operating state of the longitudinal voltage source according to FIG. 1.

In order to achieve a desired current or load distribution of the input current Iin or of the currents I1 and I2 fed in at the two feed connections E1 and E2 of the longitudinal voltage source 10 over the two output connections A1 and A2 and thus a corresponding current distribution in the two high-voltage direct current transmission lines 21 and 22, the two switches S1 and S2, the two switching units SH1 and SH2 and the two switching devices SR1 and SR2 can make possible three operating states of the longitudinal voltage source 10; this is explained below by way of example in more detail in connection with FIGS. 2 to 4.

FIG. 2 shows a first operating state of the longitudinal voltage source 10, in which the switches S of the first switching device SR1, the second switch S2 and the first switching unit SH1 are switched on; the first switch S1, the second switching unit SH2 and the second switching device SR2 are switched off.

In the first operating state according to FIG. 2, the voltage Uc dropped at the energy store 11, which is preferably a capacitor c, is switched into the current path P1 between the first feed connection E1 and the first output connection A1; the second current path P2 between the second feed connection E2 and the second output connection A2 is guided past the electrical energy store 11, with the result that it does not see the voltage Uc of the energy store 11.

Depending on the sign of the voltage Uc at the energy store 11 or the direction of the voltage Uc at the energy store 11, the voltage drop between the first feed connection E1 and the first output connection A1 is increased or decreased by the voltage Uc.

Depending on the direction of the voltage Uc present at the energy store 11, the first current I1 in the first current path P1 between the first feed connection E1 and the first output connection A1 is therefore increased or decreased with respect to the current I2 in the second current path P2 between the second feed connection E2 and the second output connection A2, as a result of which there is a corresponding load shift or change in the load current distribution of the input current Iin in the feed line 23 to the two high-voltage direct current transmission lines 21 and 22 of the direct current transmission system 20.

In a second operating state of the longitudinal voltage source 10, the energy store 11 is switched into the second current path P2 between the second feed connection E2 and the second output connection A2; the first current path P1 is guided past the energy store. The second operating state is shown in FIG. 3.

In FIG. 3, it can be seen that for the second operating state the first switch S1, the second switching device SR2 and the second switching unit SH2 are switched on; the other switching components are switched off. Depending on the sign of the voltage or the direction of the voltage Uc at the energy store 11, the current I2 in the second current path P2 is therefore increased or decreased with respect to the current I1 in the first current path P1, with the result that there is a corresponding load current shift of the input current Iin in the feed line 23 to the two high-voltage direct current transmission lines 21 and 22 of the direct current transmission system 20.

FIG. 4 shows a third operating state of the longitudinal voltage source 10. In the third operating state, the first switch S1 and the second switch S2 are switched on; the other switching components are switched off. In the third operating state according to FIG. 4, the energy store 11 or the voltage Uc thereof is disconnected from the two current paths P1 and P2, with the result that the voltage Uc has no influence on the current distribution.

Figure 5:
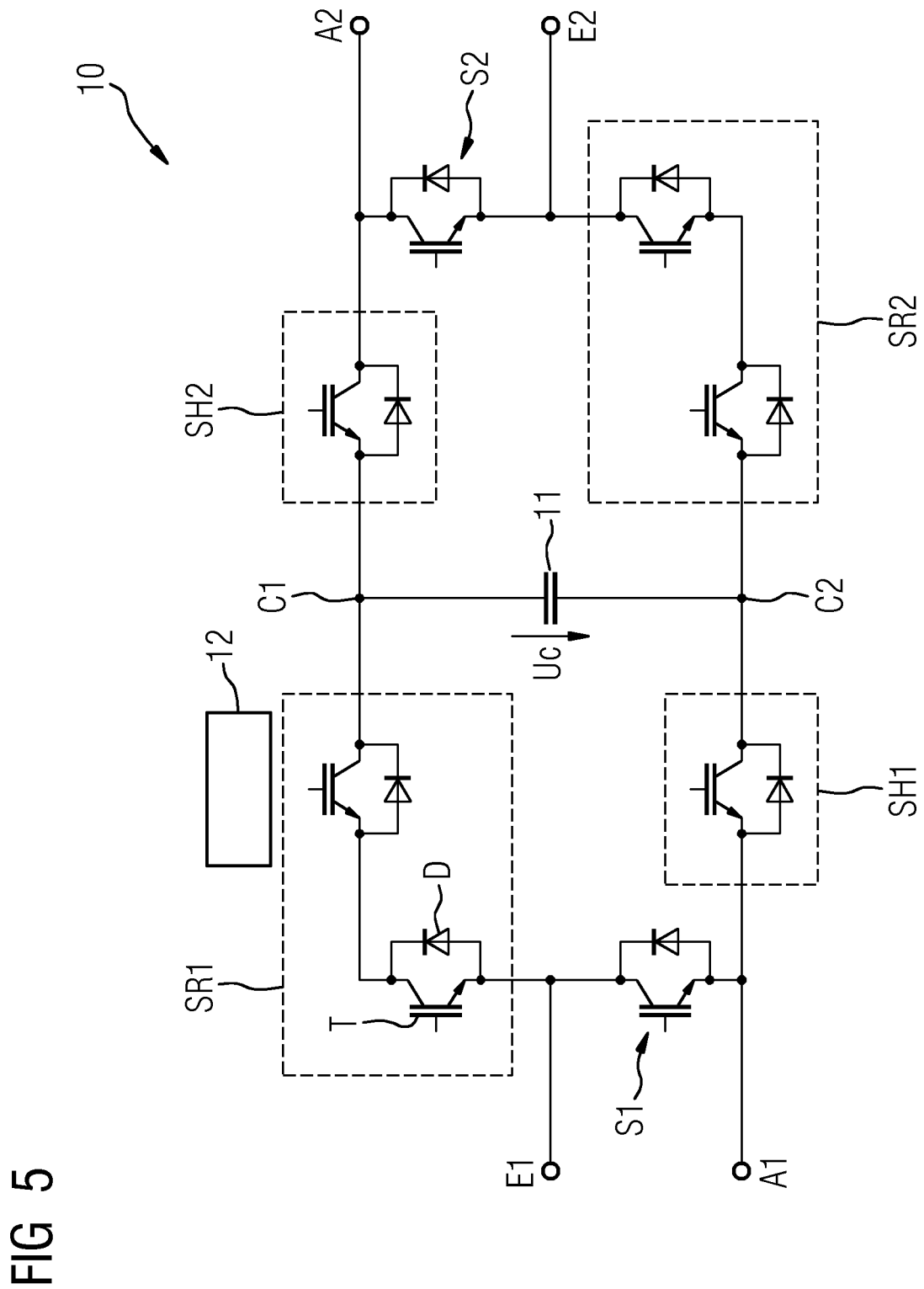
FIG. 5 shows an exemplary embodiment of a longitudinal voltage source suitable for the direct current transmission system according to FIG. 1 more specifically in detail.

FIG. 5 shows an exemplary embodiment of the structure of a longitudinal voltage source 10, which can be used in the direct current transmission system 20 according to FIGS. 1 to 4. The switches S1 and S2, the switches of the switching devices SR1 and SR2 and the switches of the switching units SH1 and SH2 are externally switchable semiconductor switches that operate in unipolar fashion. It can be seen that the switches are each formed by a transistor T, which is actuated by a control device 12, and a diode D connected in antiparallel therewith. Each of the switches is therefore able to be switched on and off by the control device 12 only in a unipolar direction; in the opposite current direction, the diode D forms in each case a freewheel.

The interconnection of the diodes D and the transistors T shown in FIG. 5 results in load flow control being possible only in one direction, that is to say in a unidirectional manner; this is because the energy store 11 should always be operated with a positive voltage Uc in the voltage direction shown in FIG. 5 in order to prevent a short circuit of the energy store 11 being able to occur in the first and second operating state by way of the freewheeling diodes D.

To set up the operation of the longitudinal voltage source 10, the control device 12 will initially set the voltage Uc at the energy store 11 to a desired output value of for example +2 kV.

If subsequently during the operation of the direct current transmission system 20 the situation arises in which the current distribution in the direction of the first output connection A1 and the second output connection A2 is asymmetrical and the load flow in the first current path P1 is continuously greater than in the second current path P2, it is possible for there to be a switch in the positive voltage direction into the first current path P1 or in the negative voltage direction into the second current path P2 by way of a temporary, alternating switch-on (for example within the context of pulse-width modulation) of the first and second operating state of the energy store 11, as a result of which in both cases there is a respective shift in the load flow from the first current path in the direction of the second current path. Since the energy store 11 in the first operating state is charged and in the second is discharged, the state of charge of the energy store 21 can be kept constant in the case of identical or at least approximately identical periods for the first and second operating state within the context of pulse-width modulation.

The duration of the first and second operating states (and the duration of the third operating state in between in each case) and the level of the operating voltage of the energy store 11 determine the extent of the change in load flow or the shift in load flow in favor of the first current path.

Figure 6:
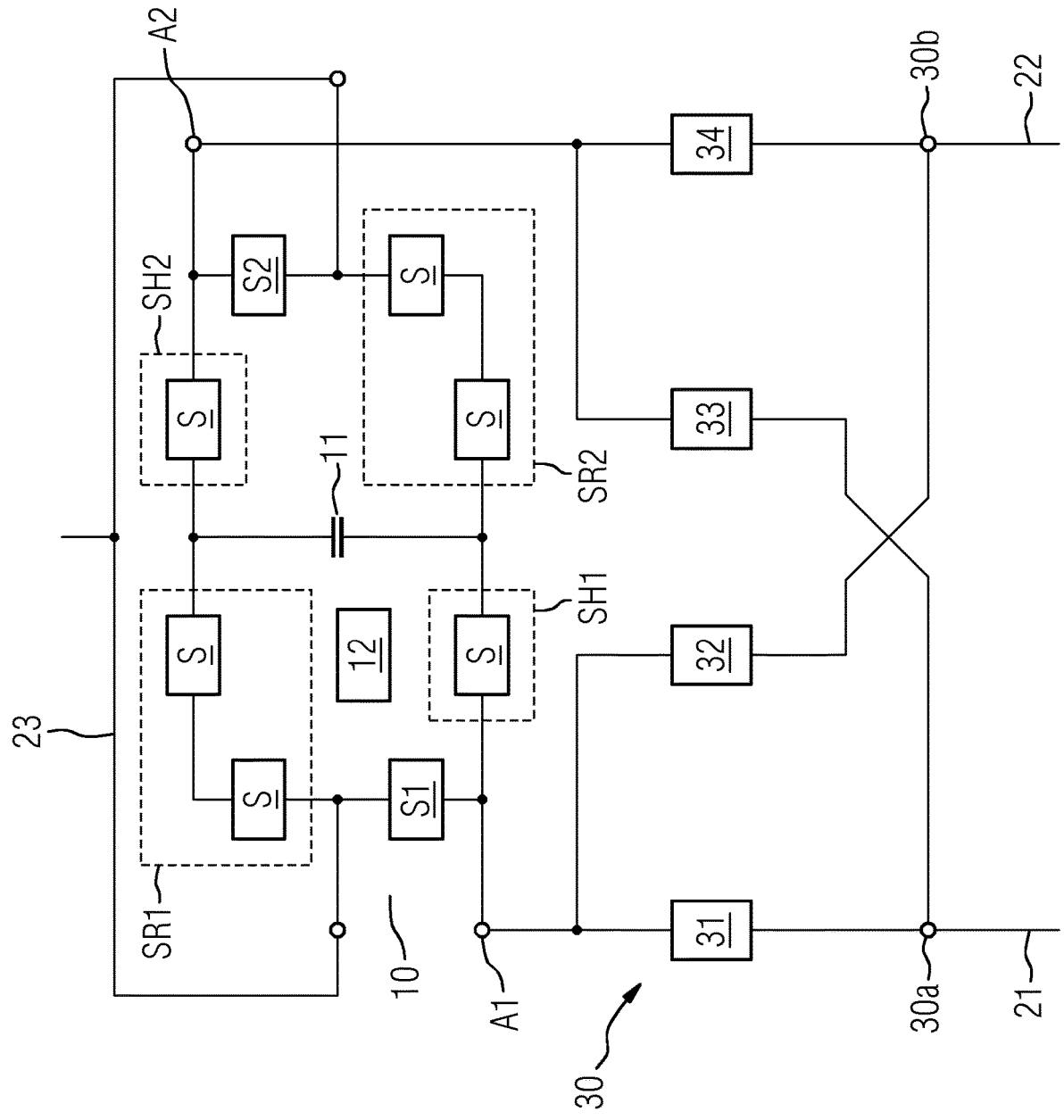
FIG. 6 shows an exemplary embodiment of a direct current transmission system in which a polarity reversal device is arranged downstream of a longitudinal voltage source.

FIG. 6 shows an exemplary embodiment of a direct current transmission system 20 in which a polarity reversal device 30 is arranged downstream of a longitudinal voltage source 10. In electrical terms, the polarity reversal device 30 is present between the two output connections A1 and A2 of the longitudinal voltage source 10 and the two high-voltage direct current transmission lines 21 and 22 of the direct current transmission system 20.

The polarity reversal device 30 according to FIG. 6 has four switches 31, 32, 33 and 34 and in a first position connects the first output connection A1 of the longitudinal voltage source 10 to the first conductor connection contact 30a of the polarity reversal device 30 and therefore to the first high-voltage direct current transmission line 21 and the second output connection A2 of the longitudinal voltage source 10 to a second conductor connection contact 30b of the polarity reversal device 30 and therefore to the second high-voltage direct current transmission line 22 of the direct current transmission system 20.

In an inverse or second position of the polarity reversal device 30, the first output connection A1 of the longitudinal voltage source 10 is connected to the second conductor connection contact 30b of the polarity reversal device 30 and therefore to the second high-voltage direct current transmission line 22 of the direct current transmission system 20 and the second output connection A2 of the longitudinal voltage source 10 is connected to the first conductor connection contact 30a of the polarity reversal device 30 and to the first high-voltage direct current transmission line 21, respectively.

The polarity reversal device 30 makes bidirectional load flow control possible with just one longitudinal voltage source 10 operating in unidirectional fashion, wherein the load flow direction is set by selecting the first or second position of the polarity reversal device 30.

With regard to minimal electrical losses, it is considered to be advantageous when the four switches 31, 32, 33 and 34 of the polarity reversal device 30 are mechanical switches, since these cause very low electrical losses in the connected state, at least fewer than semiconductor switches, as are shown in connection with FIG. 5.

Figure 7:
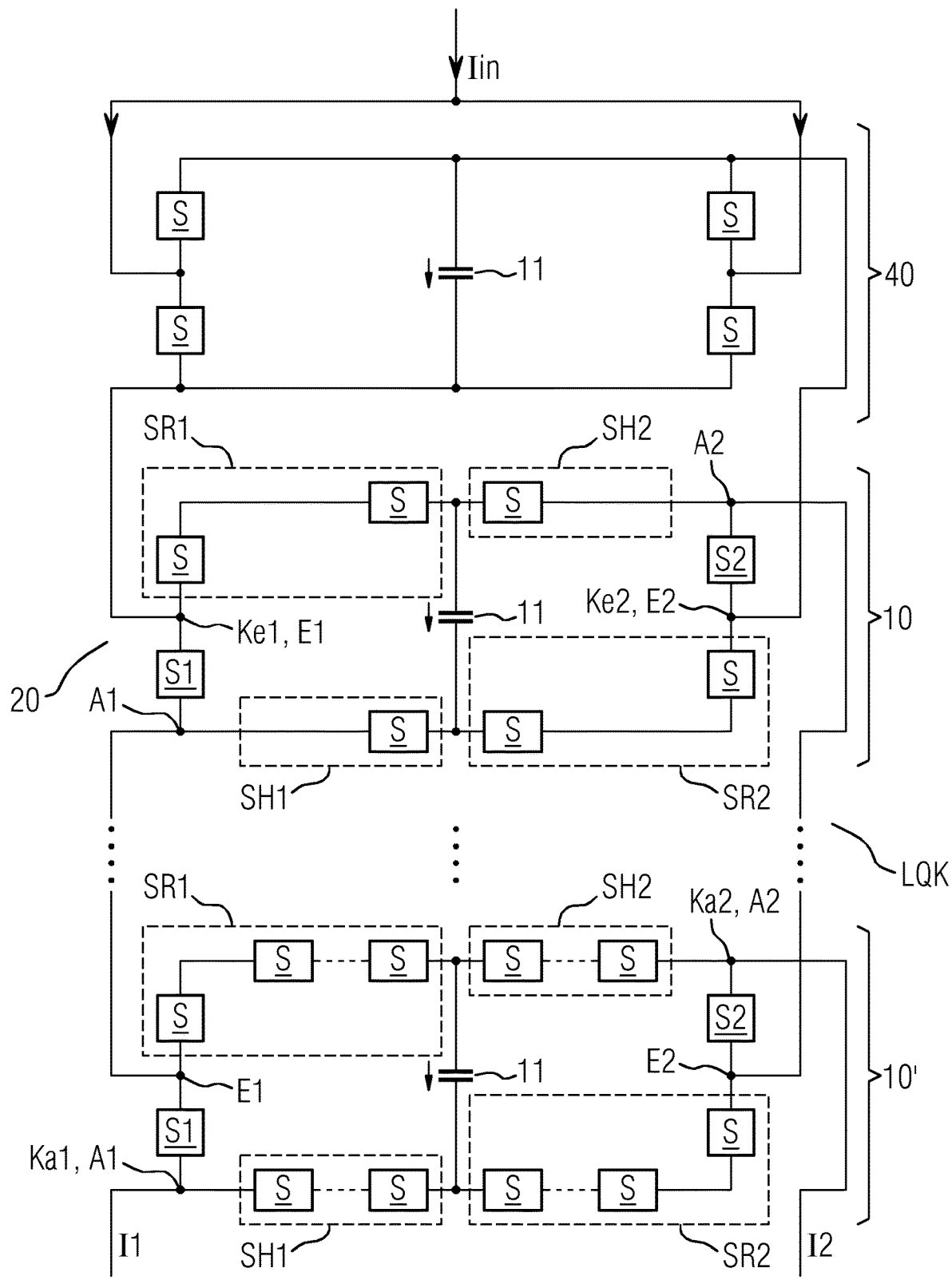
FIG. 7 shows an exemplary embodiment of a direct current transmission system having a longitudinal voltage source cascade.

FIG. 7 shows an exemplary embodiment of a direct current transmission system 20 in which a plurality of longitudinal voltage sources, preferably those according to FIGS. 1 to 6, form a longitudinal voltage source cascade LQK. Of the longitudinal voltage sources of the longitudinal voltage source cascade LQK, for reasons of clarity only two are shown, namely the first, which is characterized by the reference sign 10, and the last, which is characterized by the reference sign 10'.

A first input Ke1 of the longitudinal voltage source cascade LQK is formed by a first feed connection E1 of the first longitudinal voltage source 10 of the longitudinal voltage source cascade LQK. A second input Ke2 of the longitudinal voltage source cascade LQK is formed by a second feed connection E2 of the first longitudinal voltage source 10 of the longitudinal voltage source cascade LQK. A first output Ka1 of the longitudinal voltage source cascade LQK is formed by a first output connection A1 of the last longitudinal voltage source 10' of the longitudinal voltage source cascade and second output Ka2 of the longitudinal voltage source cascade LQK is formed by a second output connection A2 of the last longitudinal voltage source 10' of the longitudinal voltage source cascade LQK.

In each case one longitudinal voltage source is arranged downstream of each longitudinal voltage source of the longitudinal voltage source cascade LQK, with the exception of the last, wherein the first feed connection E1 of each downstream longitudinal voltage source is connected to the first output connection A1 of the upstream longitudinal voltage source and the second feed connection E2 of each downstream longitudinal voltage source is connected to the second output connection A2 of the upstream longitudinal voltage source.

It can be seen from FIG. 7 that the number of switches S per switching unit SH1 and SH2 or switching device SR1 and SR2 increases from longitudinal voltage source to longitudinal voltage source in each case by one switch S. This measure results in the dielectric strength of the switching devices and switching units of the longitudinal voltage sources of the longitudinal voltage source cascade LQK increasing from longitudinal voltage source to longitudinal voltage source in each case by the cutoff voltage of the energy store 11 of the longitudinal voltage sources 10.

The direct current transmission system 20 according to FIG. 7 furthermore has a longitudinal voltage source 40, as is known from the prior art.

The above statements in connection with FIGS. 1 to 6 otherwise apply accordingly to the direct current transmission system 20 according to FIG. 7.

Figure 8:
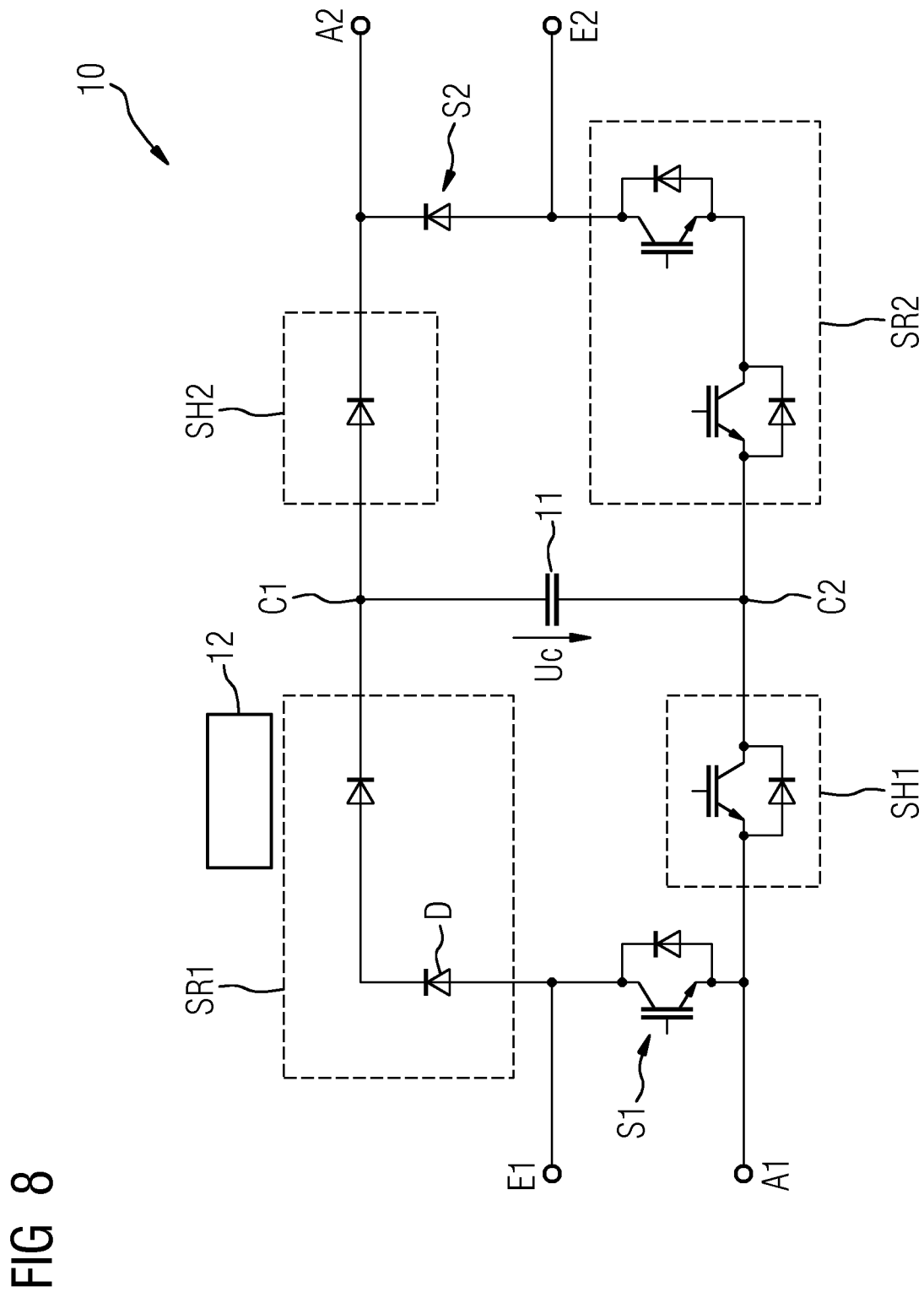
FIG. 8 shows a variant of the exemplary embodiment according to FIG. 5 in which some switches are embodied as non-controllable valves in the form of a diode.

FIG. 8 shows an embodiment variant of the longitudinal voltage source 10 according to FIG. 5. It can be seen that in the case of the longitudinal voltage source 10 according to FIG. 8 the switches S of the first switching device SR1, the switch S of the second switching unit SH2 and the second switch S2 are formed only by one non-controllable valve in the form of a diode D; in contrast to the exemplary embodiment according to FIG. 5 there is no parallel-connected transistor. The parallel-connected transistor can be omitted in the case of the first switching device SR1, the second switching unit SH2 and the second switch S2 in the case of the longitudinal voltage source 10 according to FIG. 5, since the respective flow of current in all switching states of the longitudinal voltage source is always in the forward direction of the diodes.

The explanations in connection with FIG. 5 otherwise apply accordingly to the variant according to FIG. 8.

Although the invention has been illustrated and described in more detail by way of preferred exemplary embodiments, the invention is not restricted by the disclosed examples and other variations can be derived herefrom by a person skilled in the art without departing from the scope of protection of the invention.

LIST OF REFERENCE SIGNS

10 Longitudinal voltage source
10' Longitudinal voltage source
11 Energy store
12 Control device
20 Direct current transmission system
21 High-voltage direct current transmission line
22 High-voltage direct current transmission line
23 Feed line
30 Polarity reversal device
30a Conductor connection contact 30b Conductor connection contact
31 Switch
32 Switch
33 Switch
34 Switch
40 Longitudinal voltage source
A1 Output connection
A2 Output connection
C Capacitor
C1 Connection
C2 Connection
D Diode
E1 Feed connection
E2 Feed connection
I1 Current
I2 Current
Iin Input current
Ka1 Output
Ka2 Output
Ke1 Input
Ke2 Input
LQK Longitudinal voltage source cascade
M1 Center connection
M2 Center connection
P1 Current path
P2 Current path
R1 Series circuit
R2 Series circuit
S Switch
S1 Switch
S2 Switch
SH1 Switching unit
SH2 Switching unit
SR1 Switching device
SR2 Switching device
T Transistor
Uc Voltage

The invention claimed is:

1. A switchable longitudinal voltage source, comprising:
a first feed connection for feeding in a first current;
a first output connection for outputting the first current;
a second feed connection for feeding in a second current;
a second output connection for outputting the second current;
an electrical energy store having a first connection and a second connection, wherein the switchable longitudinal voltage source being suitable for switching a voltage of said electrical energy store of the switchable longitudinal voltage source selectively between said first feed connection and said first output connection or between said second feed connection and said second output connection;
a first switching device, said first feed connection being connected by means of said first switching device to said first connection of said electrical energy store;
a second switching device, said second feed connection being connected by means of said second switching device to said second connection of said electrical energy store;
a first series circuit, containing a first switch and a first switching unit and connects said first feed connection to said second connection of said electrical energy store, is connected to said first feed connection;
said first switch having a first connection forming an outer connection of said first series circuit as well as said first feed connection, said first switching unit having a first connection forming a second outer connection of said first series circuit and is connected to said second connection of said electrical energy store, and in electrical terms a center connection of said first series circuit is present between a second connection of said first switch and a second connection of said first switching unit;
a second series circuit, containing a second switch and a second switching unit and connects said second feed connection to said first connection of said electrical energy store, is connected to said second feed connection;
said second switch having a first connection forming an outer connection of said second series circuit as well as said second feed connection, said second switching unit having a first connection forming a second outer connection of the second series circuit and is connected to said first connection of said electrical energy store, and in electrical terms a center connection of said second series circuit is present between a second connection of said second switch and a second connection of said second switching unit;
said center connection of said first series circuit directly forms said first output connection; and
said center connection of said second series circuit directly forms said second output connection.

2. The switchable longitudinal voltage source according to claim 1, wherein said second switching device, said first switching unit and said first switch are each formed by an externally controllable valve or each has at least one said externally controllable valve.

3. The switchable longitudinal voltage source according to claim 1, wherein said first switch, said second switch, said first switching unit, said second switching unit, said first switching device and said second switching device each exhibit unipolar switching.

4. The switchable longitudinal voltage source according to claim 1, wherein:
said first switching unit and said second switching unit are each formed by one switch or at least two series-connected switches;
said first switching device and said second switching device are each formed by at least two series-connected switches;
said first switching device and said second switching device each have one more switch than said first switching unit and said second switching unit; and
all said switches exhibit unipolar switching.

5. The switchable longitudinal voltage source according to claim 1, wherein:
said first switching device has switches, at least one of said switches, is formed by a non-controllable valve;
said second switching device has switches, at least one of said switches is formed by a non-controllable valve; and/or
said second switch is formed by a non-controllable valve.

6. A configuration, comprising:
a switchable longitudinal voltage source according to claim 1, said switchable longitudinal voltage source further having first and second conductor connection contacts;
a polarity reversal device disposed downstream of said switchable longitudinal voltage source and is connected between said first and second output connections and said first and second conductor connection contacts of said switchable longitudinal voltage source, wherein said polarity reversal device in a first position connects said first output connection to said first conductor connection contact and said second output connection to said second conductor connection contact, and wherein said polarity reversal device in a second position connects said first output connection to said second conductor connection contact and said second output connection to said first conductor connection contact.

7. A method for operating a switchable longitudinal voltage source according to claim 1, which comprises the steps of:
connecting the electrical energy store either between the first feed connection and the first output connection of the switchable longitudinal voltage source or the switchable longitudinal voltage sources or between the second feed connection and the second output connection of the switchable longitudinal voltage source or the switchable longitudinal voltage sources or is disconnected from all of the first and second feed connections.

8. A method for operating a longitudinal voltage source cascade having at least two switchable longitudinal voltage sources according to claim 1, the longitudinal voltage source cascade having:
a first input formed by the first feed connection of a first longitudinal voltage source of the switchable longitudinal voltage sources;
a second input formed by the second feed connection of the first longitudinal voltage source of the longitudinal voltage source cascade;
a first output formed by the first output connection of a last longitudinal voltage source of the switchable longitudinal voltage sources of the longitudinal voltage source cascade;
a second output formed by the second output connection of the last longitudinal voltage source of the longitudinal voltage source cascade; and
in each case one of the switchable longitudinal voltage sources being disposed downstream of each said longitudinal voltage source with an exception of the last longitudinal voltage source, wherein the first feed connection of each downstream said longitudinal voltage source is connected to the first output connection of an upstream the longitudinal voltage source and the second feed connection of each downstream said longitudinal voltage source is connected to the second output connection of an upstream the longitudinal voltage source;
which comprises the steps of:
connecting the electrical energy store either between the first feed connection and the first output connection of the switchable longitudinal voltage source or the switchable longitudinal voltage sources or between the second feed connection and the second output connection of the switchable longitudinal voltage source or the switchable longitudinal voltage sources or is disconnected from all of the first and second feed connections.

9. The switchable longitudinal voltage source according to claim 1, wherein:
said first switch and said second switch are of identical structure; and/or
said first switching unit and said second switching unit are of identical structure; and/or
said first switching device and said second switching device are of identical structure; and/or
said first switching device has switches being of identical structure to at least one switch of said second switching unit; and/or
said first switching device has switches being of identical structure to said second switch; and/or
said second switching unit has switches being of identical structure to said second switch.

10. The switchable longitudinal voltage source according to claim 9, wherein at least one of said switches of the switchable longitudinal voltage source is formed by a non-controllable valve.

11. The switchable longitudinal voltage source according to claim 10, wherein said non-controllable valve is a diode.

12. A longitudinal voltage source cascade, comprising at least two switchable longitudinal voltage sources as claimed in claim 1.

13. The longitudinal voltage source cascade according to claim 12, wherein:
the longitudinal voltage source cascade having a first input formed by said first feed connection of a first longitudinal voltage source of said switchable longitudinal voltage sources;
the longitudinal voltage source cascade having a second input formed by said second feed connection of said first longitudinal voltage source of the longitudinal voltage source cascade;
the longitudinal voltage source cascade having a first output formed by said first output connection of a last longitudinal voltage source of said switchable longitudinal voltage sources of the longitudinal voltage source cascade;
the longitudinal voltage source cascade having a second output formed by said second output connection of said last longitudinal voltage source of the longitudinal voltage source cascade; and
in each case one of said switchable longitudinal voltage sources is disposed downstream of each said longitudinal voltage source with an exception of said last longitudinal voltage source, wherein said first feed connection of each downstream said longitudinal voltage source is connected to said first output connection of an upstream said longitudinal voltage source and said second feed connection of each downstream said longitudinal voltage source is connected to said second output connection of an upstream said longitudinal voltage source.

14. The longitudinal voltage source cascade according to claim 12, wherein a dielectric strength of said first and second switching devices and said first and second switching units of said switchable longitudinal voltage sources of the longitudinal voltage source cascade increases from longitudinal voltage source to longitudinal voltage source in each case by a cutoff voltage of said electrical energy store of said switchable longitudinal voltage sources.

15. The longitudinal voltage source cascade according to claim 12, wherein said first and second switching units and said first and second switching device have switches and a number of said switches per said first and second switching units and said first and second switching device increases from longitudinal voltage source to longitudinal voltage source in each case by one switch.

16. A direct current transmission system, comprising:
at least one switchable longitudinal voltage source according to claim 1; and
a first and a second high-voltage direct current transmission line, connected to said first and second output connections of said at least one switchable longitudinal voltage source or said first and second outputs of said longitudinal voltage source cascade.

17. The direct current transmission system according to claim 16,
- wherein said switchable longitudinal voltage source has first and second conductor connection contacts;
- further comprising a polarity reversal device disposed downstream of said switchable longitudinal voltage source and connected between said first and second output connections and said first and second conductor connection contacts of said switchable longitudinal voltage source;
- wherein said polarity reversal device in a first position connects said first output connection to said first conductor connection contact and said second output connection to said second conductor connection contact; and
- wherein said polarity reversal device in a second position connects said first output connection to said second conductor connection contact and said second output connection to said first conductor connection contact.

18. The direct current transmission system according to claim 16, wherein:
- said at least one switchable longitudinal voltage source is one of at least two switchable longitudinal voltage sources together forming a longitudinal voltage source cascade;
- said longitudinal voltage source cascade having a first input formed by said first feed connection of a first longitudinal voltage source of said switchable longitudinal voltage sources;
- said longitudinal voltage source cascade having a second input formed by said second feed connection of said first longitudinal voltage source of said longitudinal voltage source cascade;
- said longitudinal voltage source cascade having a first output formed by said first output connection of a last longitudinal voltage source of said switchable longitudinal voltage sources of said longitudinal voltage source cascade;
- said longitudinal voltage source cascade having a second output formed by said second output connection of said last longitudinal voltage source of said longitudinal voltage source cascade; and
- in each case one of said switchable longitudinal voltage sources is disposed downstream of each said longitudinal voltage source with an exception of said last longitudinal voltage source, wherein said first feed connection of each downstream said longitudinal voltage source is connected to said first output connection of an upstream said longitudinal voltage source and said second feed connection of each downstream said longitudinal voltage source is connected to said second output connection of an upstream said longitudinal voltage source.

* * * * *